E. NILSEN.
SANITARY PROTECTIVE DEVICE FOR CUSPIDORS.
APPLICATION FILED JUNE 30, 1914.
1,122,022.
Patented Dec. 22, 1914.
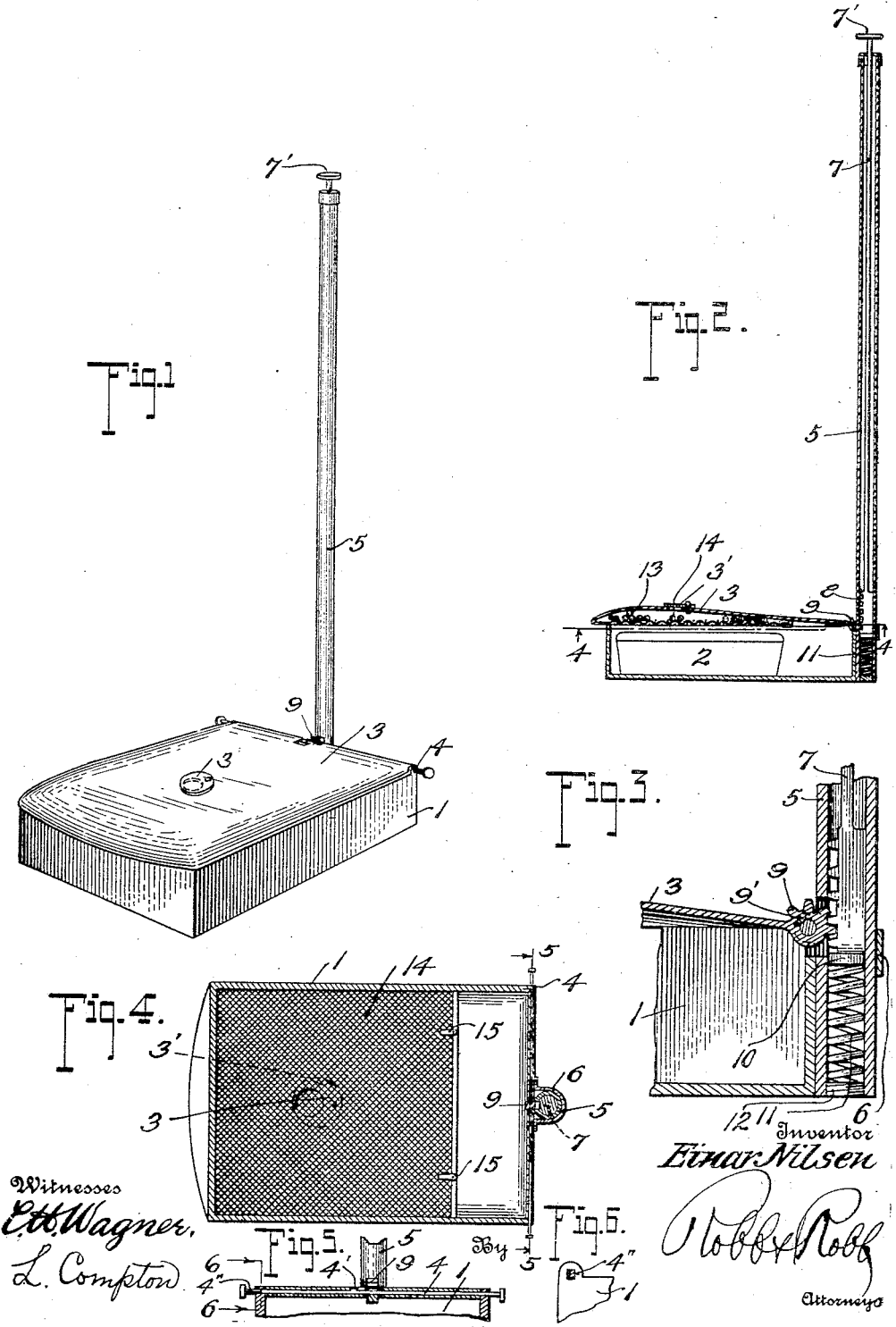

UNITED STATES PATENT OFFICE.

EINAR NILSEN, OF BALTIMORE, MARYLAND.

SANITARY PROTECTIVE DEVICE FOR CUSPIDORS.

1,122,022. Specification of Letters Patent. Patented Dec. 22, 1914.

Application filed June 30, 1914. Serial No. 848,287.

*To all whom it may concern:*

Be it known that I, EINAR NILSEN, a subject of the King of Norway, residing at Baltimore, State of Maryland, have invented certain new and useful Improvements in Sanitary Protective Devices for Cuspidors, of which the following is a specification.

The object of this invention is to provide a sanitary protective device for cuspidors, the essence of the invention lying in the provision of a suitable receptacle to receive the cuspidor, including a cover for said receptacle which constitutes a holding means for a disinfective or deodorizing agent, manually operable means being employed to open said cover to gain access to the cuspidor.

It is further contemplated as a novel feature of my invention to provide locking means for the cover so that it may be held in open position when desired to facilitate removal of the cuspidor for cleansing purposes as well as to enable renewal of the disinfecting agent before mentioned.

These and such other objects as may hereinafter appear are attained by the novel construction, combination and arrangement of parts to be hereinafter specifically described and claimed.

Reference will now be had to the accompanying drawings forming a part of this specification wherein:

Figure 1 is a perspective view of a device forming an embodiment of my invention. Fig. 2 is a vertical sectional view through the device. Fig. 3 is an enlarged sectional view showing more clearly the operative connection between the cover of the receptacle and its operating member. Fig. 4 is a horizontal, sectional view on the line 4—4 of Fig. 2. Fig. 5 is a detail fragmentary sectional view on the line 5—5 of Fig. 4 showing more clearly the interlocking means intermediate the cover and the receptacle for holding said cover in open position; and Fig. 6 is a fragmentary, sectional view on the line 6—6 of Fig. 5.

Throughout the following detail description, and on the several figures of the drawings, similar parts are referred to by like reference characters.

Referring to the drawing, the numeral 1 designates a receptacle of any desirable shape and suitable size for containing a cuspidor of conventional form designated 2. The receptacle is provided with a cover 3 pivotally secured to the rear and topmost edge of the receptacle upon a pintle 4. Disposed at the rear of the receptacle 1 is a vertical tubular standard 5 preferably secured to the rearmost wall of said receptacle by means of a clip 6. This standard constitutes a housing and a guide means for the operating rod 7 provided at its lower extremity with a rack section 8 intermeshing through an opening in the lowermost portion of the standard with a gear element 9 formed on the pivoted edge of the cover as most clearly shown in Fig. 3 of the drawing. The lower extremity of the operating rod is preferably formed with a plunger or piston 10 resting upon a spiral spring 11 inserted into the bottom of the standard, a removable plug 12 enabling such disposition of the spring member.

It will be obvious from the foregoing description that access to the interior of the receptacle 1 whenever it is desired to use the cuspidor may be gained by depressing the operating rod 7 at its upper extremity 7', movement of the rod against the expansive action of the spring opening the cover 3 through the instrumentality of the rack and gear connection between said rod and the same. Release of pressure upon the rod will permit the spring 11 to actuate the cover to positively close the receptacle in an obvious manner. The cover, as shown clearly in Fig. 2, is provided with a shallow recess in which is disposed a deodorizing or disinfecting agent designated in the drawings by the numeral 13, said agent being held in position by means of a screen 14 detachably secured to the underside of the cover by means of fastening members 15, shown in Fig. 4. If desired the disinfectant may be inserted through opening in top beneath pivoted cap 3'.

In order to facilitate the removal of the cuspidor for cleaning purposes or the renewal of the disinfecting agent 14 I preferably provide locking means for holding the cover in open position which locking means is normally inactive so far as opening and closing actions of the cover are concerned. To this end the pintle 4 for the cover is provided intermediate its length with an offstanding lug 4' which is adapted to interlock with a notch or recess 9' in the gear element 9 of the cover when the pintle is shifted longitudinally in its bearings at the sides of the receptacle 1, such interlocking action only being applicable, however, when the cover is in raised position and the notch 9' is brought into registering position with respect to the lug 4'. In order to prevent rotation of the pintle 4 when thus engaged, one of its extremities designated 4'' is made square in cross section as shown in Fig. 6 and the bearing at this side of the receptacle being likewise shaped to enable the pintle to be interlocked with said receptacle when shifted laterally as hereinbefore mentioned. The extremities of the pintle extend out from the wall of the receptacle so as to provide manipulating means therefor to cause the shifting action which may be accomplished by moving the pintle with the foot while the cover is held in raised position by depression of the operating rod extremity 7'.

The foregoing device may be cheaply manufactured and forms a most sanitary protective arrangement for confining the odors from a cuspidor and maintaining the same in disinfected condition.

Having thus described my invention what I claim as my invention is:

1. In a sanitary protective device for cuspidors, the combination of a receptacle in which said cuspidor is disposed, a cover member pivotally secured to the receptacle, an operating member operatively connected to the cover member for actuating the same to open and close the receptacle, and locking means intermediate the operating member and the cover for holding the cover in open position to facilitate removal of the cuspidor from the receptacle, said locking means constituting a pivot for said cover.

2. In a sanitary protective device for cuspidors, the combination of a receptacle in which said cuspidor is disposed, a cover member for said receptacle, a shiftable pintle for said cover member having its bearings in said receptacle, an operating member operatively connected to the cover for actuating the same, and means for moving said pintle to cause interlocking connection intermediate the cover and the receptacle to maintain the cover in open position.

3. In a sanitary protective device for cuspidors, the combination of a receptacle in which said cuspidor is disposed, a cover member pivotally secured to the receptacle, a pintle for said cover having its bearings in the receptacle and shiftable in a longitudinal direction, the cover aforesaid being formed with a gear element adjacent its pintle, and a spring actuated operating rod formed with a rack section engaging the gear element on the cover, locking means for holding the receptacle cover in open position and comprising a lug formed on the pintle, the gear element of the cover being provided with a recess in which the lug aforesaid is adapted to engage when the cover is in raised position upon shifting of the pintle laterally with respect to said cover, the pintle aforesaid having interlocking connection with the receptacle whereby to prevent rotation of said pintle when the lug is interlocked with the cover.

In testimony whereof I affix my signature in presence of two witnesses.

EINAR NILSEN.

Witnesses:
G. W. MARTIN,
H. BURGESS.